(12) United States Patent
Guok et al.

(10) Patent No.: US 8,745,296 B2
(45) Date of Patent: Jun. 3, 2014

(54) SERIAL STORAGE PROTOCOL COMPATIBLE FRAME CONVERSION, AT LEAST IN PART BEING COMPATIBLE WITH SATA AND ONE PACKET BEING COMPATIBLE WITH PCIE PROTOCOL

(71) Applicants: Ngek Leong Guok, Sitiawan (MY); Chai Huat Gan, Bukit Mertajam (MY); Eng Hun Ooi, Georgetown (MY)

(72) Inventors: Ngek Leong Guok, Sitiawan (MY); Chai Huat Gan, Bukit Mertajam (MY); Eng Hun Ooi, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/633,690

(22) Filed: Oct. 2, 2012

(65) Prior Publication Data
US 2014/0095742 A1    Apr. 3, 2014

(51) Int. Cl.
*G06F 13/12*    (2006.01)

(52) U.S. Cl.
USPC .................. 710/74; 710/72; 710/73; 710/313

(58) Field of Classification Search
USPC ...................................................... 710/72–74
See application file for complete search history.

(56) References Cited

U.S. PATENT DOCUMENTS

| | | | |
|---|---|---|---|
| 5,778,189 A | 7/1998 | Kimura et al. | |
| 6,757,731 B1 | 6/2004 | Barnes et al. | |
| 8,225,019 B2 | 7/2012 | Asnaashari | |
| 8,478,916 B2* | 7/2013 | Asnaashari | 710/74 |
| 2008/0040521 A1 | 2/2008 | Sakai et al. | |
| 2010/0215086 A1 | 8/2010 | Vijayaraghavan et al. | |
| 2012/0166701 A1* | 6/2012 | Oh et al. | 710/315 |

OTHER PUBLICATIONS

International Search Report and Written Opinion received for Patent Application No. PCT/US2013/046106, mailed on Sep. 23, 2013, 9 pages.

* cited by examiner

*Primary Examiner* — Tammara Peyton
(74) *Attorney, Agent, or Firm* — Christopher K. Gagne

(57) ABSTRACT

An embodiment may include circuitry to (a) convert, at least in part, at least one serial storage protocol compatible frame into at least one packet that is compatible, at least in part, with a multi-lane input/output (I/O) protocol, and/or (b) convert, at least in part, the at least one packet into the at least one frame. The at least one packet may be transmitted via a physical layer that is compatible, at least in part, with the multi-lane I/O protocol. The at least one packet may comprise frame information structure (FIS) information of the at least one frame.

21 Claims, 2 Drawing Sheets

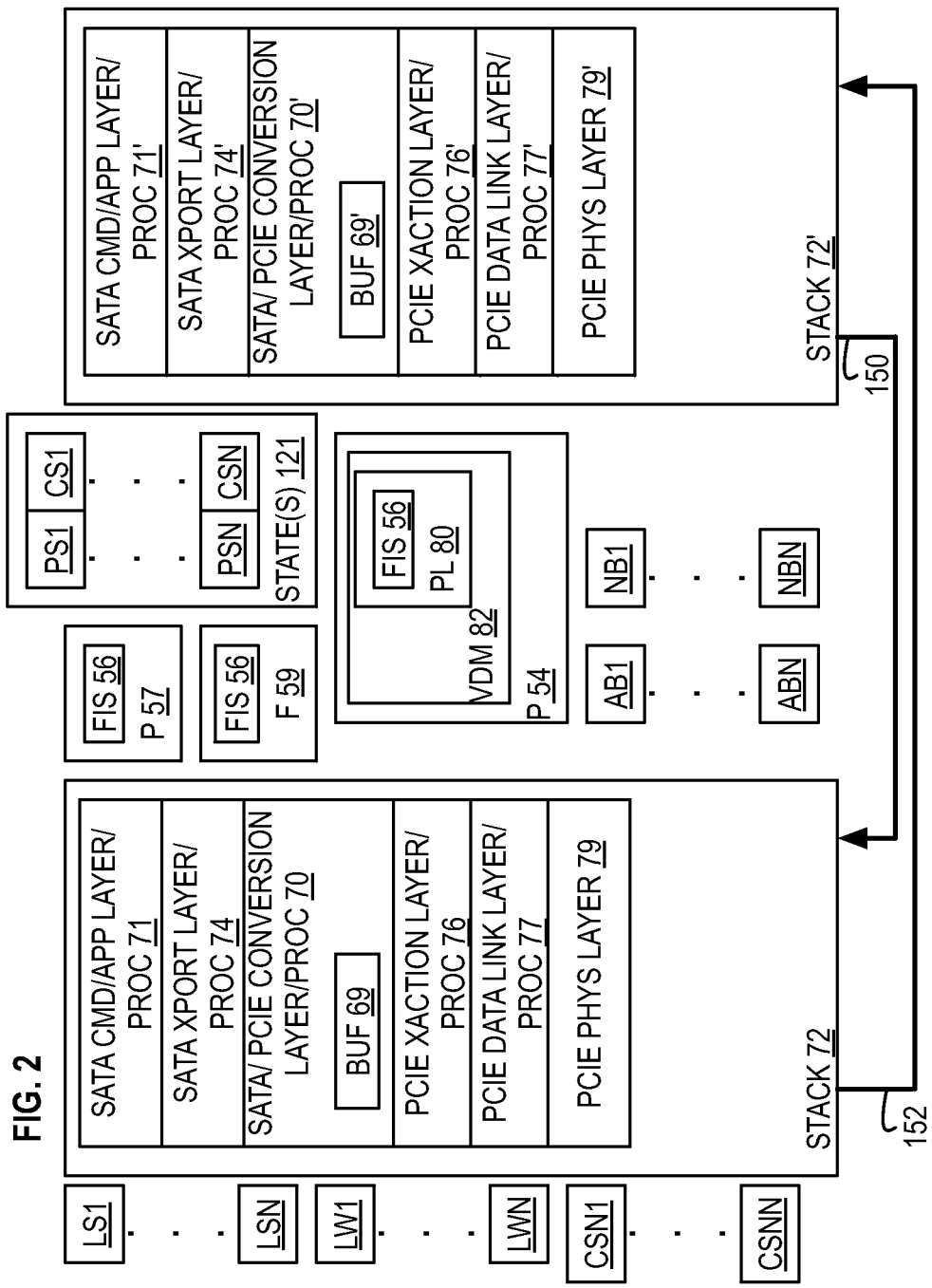

SERIAL STORAGE PROTOCOL COMPATIBLE FRAME CONVERSION, AT LEAST IN PART BEING COMPATIBLE WITH SATA AND ONE PACKET BEING COMPATIBLE WITH PCIE PROTOCOL

FIELD

This disclosure relates to serial storage protocol compatible frame conversion, at least in part.

BACKGROUND

Serial storage protocols, such as, serial advanced technology attachment (SATA) protocol, have gained widespread use and acceptance. Although SATA protocol (e.g., as described in "Serial ATA Revision 3.1," Gold Revision, Serial ATA International Organization, Jul. 18, 2011) provides for a significant maximum permitted communication bandwidth, that bandwidth is inherently limited by certain parameters of the SATA protocol itself. For example, the SATA protocol provides only for single lane, half duplex communication. These and other provisions of the SATA protocol inherently limit or reduce the maximum communication bandwidth that could otherwise be carried out in accordance with the SATA protocol.

Simply increasing the number of communication lanes, and/or attempting to communicate in full duplex, would not be satisfactory solutions, since such changes would not be compatible with SATA protocol drivers (and/or other SATA processes) that are currently deployed (e.g., that are only capable of using single lane, half duplex communications). Accordingly, it would be desirable to increase the communication bandwidth of SATA protocol communications, while maintaining compatibility with such currently deployed SATA protocol drivers (and/or other SATA processes).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 2 illustrates elements of a system embodiment.

Figure 1:
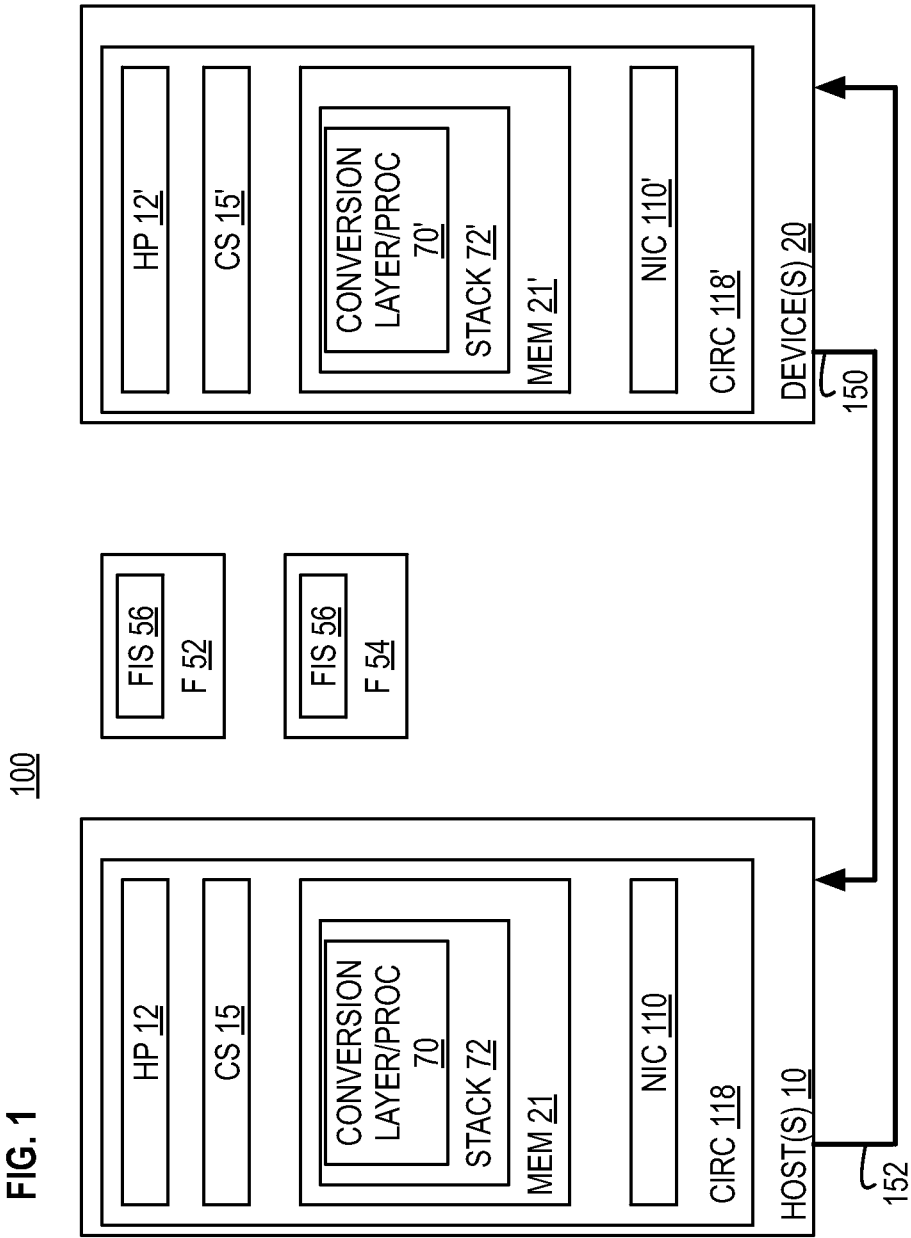
FIG. 1 illustrates elements of a system embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

FIG. 1 illustrates a system embodiment 100. System 100 may include one or more hosts 10 and/or one or more devices 20 that may be communicatively coupled together via one or more (and in this embodiment, a plurality of) communication links and/or lanes 150, 152. One or more hosts 10 and one or more devices 20 may be geographically remote from each other, at least in part, or alternatively, may be comprised, at least in part, in one or more common housings and/or chassis (not shown). In this embodiment, the terms "host computer," "host," "server," "node", and/or "device" may be used interchangeably, and may mean, for example, one or more end stations, smart phones, tablet computers, appliances, intermediate stations, network interfaces, clients, and/or servers, and/or storage and/or mass storage, and/or portions thereof. In this embodiment, a "network," "communication link," and/or "communication lane" may be used interchangeably, and may be or comprise any mechanism, instrumentality, modality, and/or portion thereof (including, for example, without limitation, one or more wired and/or wireless networks and/or one or more portions thereof) that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands.

In this embodiment, one or more lanes 150 may be or comprise, at least in part, one or more (and in this embodiment, a plurality of) physical layer communication lanes that may permit communication from one or more devices 20 to one or more hosts 10. Also, in this embodiment, one or more lanes 152 may be or comprise, at least in part, one or more (and in this embodiment, a plurality of) physical layer communication lanes that may permit communication from one or more hosts 10 to one or more devices 20. Thus, when taken together, lanes 150, 152 may permit bi-directional communication between one or more hosts 10 and one or more devices 20.

Host 10 may comprise circuitry 118. Circuitry 118 may comprise, for example, one or more single and/or multi-core host processors (HP) 12, one or more chipsets (CS) 15, computer-readable/writable memory 21, and/or one or more network interfaces controllers (NIC) 110. One or more chipsets (which may comprise, e.g., memory and/or input/output controller circuitry) 15 may communicatively couple one or more host processors 12, memory 21, and/or NIC 110. Alternatively or additionally, although not shown in the Figures, some or all of circuitry 118 and/or the functionality and components thereof may be comprised in, for example, one or more host processors 12, one or more chipsets 15, and/or one or more NIC 110. Many other alternatives are possible without departing from this embodiment.

One or more machine-readable program instructions may be stored in computer-readable/writable memory 21. In operation of one or more hosts 10, these instructions may be accessed and executed by one or more host processors 12, one or more chipsets 15, one or more NIC 110, and/or circuitry 118. When these instructions are so accessed and executed, this may result, at least in part, in one or more protocol stacks 72 and/or one or more conversion processes 70 (that may be comprised, at least in part, in one or more stacks 72) being executed at least in part by one or more host processors 12, one or more chipsets 15, one or more NIC 110, and/or circuitry 118, and/or becoming resident at least in part in memory 21. This may result in one or more host processors 12, one or more chipsets 15, one or more NIC 110, circuitry 118, one or more stacks 72, and/or one or more processes 70 performing the operations described herein as being performed by these components of system 100.

In this embodiment, a portion of an entity may comprise all or less than all of the entity. Also, in this embodiment, a stack, process, program, driver, operating system, and/or application may comprise and/or result at least in part from execution of one or more program instructions. In this embodiment, memory 21 may comprise one or more of the following types of memories: semiconductor firmware memory, programmable memory, non-volatile memory, mass storage, read only memory, electrically programmable memory, random access memory, flash memory, magnetic disk memory, optical disk memory, and/or other or later-developed computer-readable and/or writable memory.

Depending upon, for example, the particular embodiment, one or more devices 20 may comprise, in whole or in part, respective components that may correspond, at least in part, to the above-described respective components of one or more hosts 10. For example, circuitry 118', one or more host processors 12', one or more chipsets 15', memory 21', one or more stacks 72', one or more conversion processes 70', and/or one or more NIC 110' in one or more devices 20 may correspond and/or have similar (or identical) functionality to, at least in part, circuitry 118, one or more host processors 12, one or more chipsets 15, memory 21, one or more stacks 72, one or more conversion processes 70, and/or one or more NIC 110, respectively, in one or more hosts 10. However, alternatively or additionally, without departing from this embodiment, one or more devices 20 may comprise, at least in part, respective components and/or functionalities that may differ, at least in part, from respective components and/or functionalities of one or more hosts 10.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, host 10 and/or device 20 each may comprise a respective graphical user interface system. The not shown respective graphical user interface systems may comprise, e.g., respective keyboards, pointing devices, and display systems that may permit one or more human users to input commands to, and monitor the operation of, host 10, device 20, and/or system 100. Although this description will proceed with reference being made to one or more devices 20 being or comprising, at least in part, one or more storage and/or mass storage devices and/or nodes, it should be appreciated that one or more devices 20 may be or comprise, at least in part, one or more other and/or additional types of devices and/or nodes.

In operation, NIC 110 and/or chipset 15 may exchange data and/or commands with NIC 110' and/or chipset 15' via lanes 150, 152 in accordance with one or more multi-lane input/output (I/O) communication protocols. In this embodiment, a multi-lane I/O communication protocol may be, comprise, and/or facilitate, at least in part, communication via and/or using more than one communication lane. For example, in this embodiment, such data and/or commands may be comprised in and/or embodied by, at least in part, one or more packets 54 that may be communicated via lanes 150, 152. One or more packets 54 and/or lanes 150, 152 may comply and/or be compatible with, at least in part, one or more multi-lane I/O communication protocols, such as, for example, Peripheral Component Interconnect (PCI) Express protocols (e.g., as described in PCI-SIG PCIe Base Specification Revision 3.0, Nov. 10, 2010), hereinafter collectively or singly referred to as "PCIe protocol".

In this embodiment, one or more packets 54 may comprise, at least in part, frame information structure (FIS) information 56 that may be derived, obtained, and/or previously comprised in, at least in part, one or more frames 52. One or more frames 52 may comply and/or be compatible with, at least in part, SATA protocol. In an embodiment, the terms "frame" and/or "packet" may be used interchangeably, and may mean one or more symbols and/or values.

For example, as shown in FIG. 2, protocol stack 72 may comprise multiple stack layers and/or processes 71, 74, 70, 76, 77, and/or 79. Layers and/or processes 71, 74, 70, 76, 77, and/or 79 in stack 72 may correspond and/or have similar (or identical) functionalities to, at least in part, layers and/or processes 71', 74', 70', 76', 77', and/or 79', respectively, in stack 72'.

In this embodiment, SATA command/application layer and/or processes 71 and/or SATA transport layer and/or processes 74 may comply and/or be compatible with, at least in part, SATA protocol. Also in this embodiment, PCIe transaction layer and/or processes 76, PCIe data link layer and/or processes 77, and/or PCIe physical layer 79 may comply and/or be compatible with, at least in part, PCIe protocol. Of course, other and/or additional serial storage protocols and/or multi-lane I/O communication protocols (e.g., other than and/or in addition to SATA protocol and/or PCIe protocol) may be employed in this embodiment.

In this embodiment, stack 72 may comprise one or more SATA/PCIe conversion layers and/or processes 70 that may be executed (as part of the stack 72) intermediate to the SATA transport layer and/or processes 74 and the PCIe transaction layer and/or processes 76. In operation of stack 72, one or more SATA command/application layer processes 71 may generate one or more SATA compliant/compatible (at least in part) frames (not shown) that may embody and/or indicate, at least in part, data and/or commands associated with one or more requested SATA I/O operations (e.g., to be performed, at least in part, by one or more devices 20). These one or more not shown frames from processes 71 may be encapsulated and/or otherwise processed by one or more SATA transport layer processes 74 to produce one or other SATA compliant/compatible (at least in part) frames 59 that may comprise SATA FIS information 56 associated with and/or embodying these one or more commands, data, and/or SATA I/O operations.

In this embodiment, one or more frames 59 may be converted, at least in part, by one or more SATA/PCIe conversion layer processes 70, into one or more PCIe compliant packets 57 that are (and/or comprise information that is) to be transmitted, at least in part, to one or more devices 20 via PCIe physical layer 79 and/or one or more PCIe physical lanes 152. One or more packets 57 may comprise, at least in part, FIS information 56 and/or other information that may permit one or more SATA/PCIe conversion processes 70' to convert, at least in part, one or more packets 57 into one or more frames 59, after one or more processes 70' receive the one or more packets 57.

For example, one or more PCIe transaction layer processes 76 may encapsulate (and/or otherwise process) one or more packets 57, and the result thereof may be passed to one or more PCIe data link layer processes 77 that may perform additional encapsulation and/or processing. The result of the additional encapsulation and/or processing may be processed by PCIe physical layer 79 to result in generation of one or more packets 54 that may be transmitted via lanes 152 to PCIe physical layer 79'. PCIe physical layer 79' and processes 77' and 76' may strip off the encapsulations and/or processing previously imparted by PCIe physical layer 79 and processes 77 and 76, respectively, to thereby produce one or more packets 57. One or more packets 57 may be converted, at least in part, by one or more SATA/PCIe conversion processes 70' into one or more frames 59. One or more SATA transport layer processes 74' may strip off the encapsulation and/or processing previously imparted by one or more SATA transport layer processes 74, and the resulting one or more not shown packets may be processed by one or more SATA command/application layer processes 71' (e.g., to result in one or more devices 20 executing the one or more requested SATA I/O operations). The results of executing these one or more requested SATA I/O operations by one or more devices 20 may be provided to stack 72 by stack 72' in the form of one or more other PCIe compliant (at least in part) packets (not shown) transmitted to stack 72 via one or more lanes 150. Stack 72' may generate, at least in part, these one or more other PCIe compliant packets via techniques and/or operations analogous to those described previously that may be used by stack 72 to generate one or more packets 54. After receiving these one or more other PCIe compliant packets, stack 72 may process them using techniques and/or operations analogous to those described previously that may be used by stack 72' to process one or more packets 54.

In this embodiment, one or more packets 54 may be or comprise, at least in part, one or more PCIe vendor defined messages (VDM) 82 that may comply and/or be compatible with, at least in part, Section 2.2.8.6 ("Vendor_Defined Messages") of PCI-SIG PCIe Base Specification Revision 3.0, Nov. 10, 2010. One or more VDM 82 may comprise one or more data payloads 80 that may comprise FIS (and/or other) information 56 that may comprise, indicate, and/or embody, at least in part, the one or more requested SATA I/O operations (and/or results of execution thereof), and/or related data and/or commands.

One or more processes (and/or other processes) 70 may carry out, at least in part, operations to map and/or coordinate SATA and PCIe protocol operations between the SATA compliant processes/layers (e.g., processes 71 and 74) and PCIe compliant processes/layers (e.g., processes 76, 77, physical layer 79, and lanes 150, 152). This may permit the SATA compliant processes/layers to be capable of interoperating harmoniously, at least in part, with the PCIe compliant processes/layers, and vice versa.

For example, one or more processes 70 (and/or other processes in stack 72 and/or host 10) may negotiate, at least in part, with one or more processes 70' (and/or other processes in stack 72' and/or device 20) one or more link speeds LS1 ... LSN and/or link widths LW1 ... LWN (e.g., of and/or for lanes 150, 152), in accordance with PCIe protocol. In accordance with PCIe protocol the actual communication bandwidths AB1 ... ABN of that may result, at least in part, from these actually negotiated link speeds LS1 ... LSN and/or actually negotiated link widths LW1 ... LWN may be greater than the maximum bandwidths permitted by SATA protocol. Accordingly, in order to maintain inter-operative compatibility with the SATA compliant processes in stacks 72, 72', processes 70 and/or 70' may indicate (e.g., report), at least in part, to one or more of the respective SATA compliant processes 71, 74 and/or 71', 74' in their respective stacks 72 and/or 72', one or more respective negotiated bandwidths and/or link speeds (collectively and/or singly, NB1 ... NBN) that may be both different from (e.g., less than) the respective actual bandwidths AB1 ... ABN and/or link speeds LS1 ... LSN, and in accordance with SATA protocol. The negotiated bandwidths and/or link speeds NB1 ... NBN may be reported using SATA protocol status register (SStatus) field SPD. For example, conceptually, as long as the actual bandwidths AB1 ... ABN are greater than the maximum permitted SATA protocol bandwidth, the reported, negotiated bandwidths and/or link speeds NB1 ... NBN may correspond to the maximum permitted SATA bandwidth (e.g., SATA Generation 3 maximum bandwidth, corresponding to 600 megabytes per second). Depending upon particular actual bandwidths AB1 ... ABN, actual link speeds LS1 ... LSN, and/or link widths LW1 ... LWN, the particular respective negotiated bandwidths and/or link speeds NB1 ... NBN that may be reported by processes 70 and/or 70' may vary so as to maintain compatible interaction and/or inter-operation with the SATA compliant processes in their respective stacks. In this embodiment, a bandwidth condition may be, comprise, involve, relate to, refer to, reflect, indicate, and/or implicate, at least in part, state, status, usage, and/or consumption of bandwidth. Also in this embodiment, bandwidth and communication bandwidth may be used interchangeably, and may be, comprise, involve, relate to, refer to, reflect, indicate, and/or implicate, at least in part, communication capability, throughput, rate, and/or amount of communication.

Additionally or alternatively, in this embodiment, one or more processes 70 (and/or other processes in stack 72 and/or host 10) may negotiate, at least in part, with one or more processes 70' (and/or other processes in stack 72' and/or device 20), and/or manage in host 10 and/or device 20, respectively, one or more (and in this embodiment, a plurality of) respective states 121 of one or more (and in this embodiment, a plurality) of the physical layer link/lanes 150, 152. For example, states 121 may comprise respective link/lane power states PS1 ... PSN and/or respective communication states CS1 ... CSN. Processes 70 and/or 70' may negotiate and/or manage, at least in part, these states 121 in such a way as to maintain compatible interaction and/or inter-operation between the SATA compliant processes/layers and the PCIe compliant processes/layers.

For example, processes 70 and/or 70' may coordinate the establishment and/or reporting (e.g., via SATA SStatus register field DET) of the respective power and/or communication states of the respective physical lanes/links in accordance with the following. If the PCIe link training and status state machine (LTSSM) state is "detect," then the reported SATA state may correspond to "device not detected" and/or "phy communication not established." Conversely, if the PCIe LTSSM state is "polling," "configuration," or "recovery," and/or power state L0s, L1, L2, etc., then the reported SATA state may be "device detected" and/or "phy communication not established." Also conversely, if the PCIe LTSSM state is power state L0, then the reported SATA state may be "device detected" and/or "phy communication established." Further conversely, if the PCIe LTSSM state is "disabled" and/or "loopback," then the reported SATA state may be "phy in offline mode."

Additionally or alternatively, processes 70 and/or 70' may map, manage, and/or coordinate the establishment and/or reporting of SATA interface power states vis-à-vis PCIe active state power management in such a way as to maintain compatible interaction and/or inter-operation between the SATA compliant processes/layers and the PCIe compliant processes/layers. For example, in PCIe protocol, it is possible for receive and transmit sides of a given link to enter and exit power states independently of each other. In order to facilitate making this behavior compatible with SATA protocol, processes 70 and 70' may coordinate the entry and/or exit of their respective receive and transmit side links by exchanging one or more VDM-containing packets to request, initiate, and/or inform of such power state entry and/or exit. Additionally, in order to maintain compatibility with SATA protocol, the processes 70 and 70' may ensure that power state exit latency is no more than 10 microseconds. In the case of PCIe L0s power state, when both the transmit side and receive side have entered L0s, SATA partial state may be reported. In the case of PCIe L1 state, when the L1 state is entered by both receive and transmit sides, SATA slumber state may be reported.

Additionally or alternatively, processes 70 and/or 70' may temporarily store (e.g., in respective buffers 69 and/or 69') one or more frames 52 and/or one or more packets 57, and/or one or more packets 59 in order to emulate, at least in part, half-duplex communication. Buffers 69 and/or 69' may be comprised, at least in part, in processes 70 and/or 70, respectively, and/or in circuitry 118 and/or 118', respectively.

For example, PCIe protocol is a full duplex communication protocol, while, as stated above, SATA protocol is a half-duplex communication protocol (e.g., actual FIS transfer is only permitted in one direction at a time, and a SATA host is to suspend transmission in favor of device-initiated transfer). In order to resolve these potential conflicts between PCIe protocol and SATA protocol, processes 70 and 70' may temporarily buffer in respective buffers 69 and 69' incoming non-data FIS-containing packets and/or frames on the receive side. If a buffered packet contains a RH2D-FIS and the device 20 has previously sent DMAS-FIS, then one or more processes 70 may buffer the packet until after the data transfer is completed for the previously received DMAS-FIS. By carrying out these operations, it may be possible for processes 70 and 70' to maintain, at least in part, compatible interaction and/or inter-operation between the SATA compliant processes/layers and the PCIe compliant processes/layers in host 10 and device 20, respectively, despite the fact that SATA is a half-duplex protocol and PCIe is a full duplex protocol.

Additionally or alternatively, processes 70 and 70' may manage, at least in part, communication status notifications to the respective SATA compatible processes in their respective stacks 72 and 72', respectively, so as to maintain, at least in part, compatibility with SATA protocol. For example, the processes 70 and 70' may appropriately map status reporting (e.g., for error and/or normal operation conditions) of PCIe statuses to SATA statuses, and may report such SATA statuses to the SATA processes 71, 74 and/or 71', 74'. For example, if a PCIe link exits from an L0s, L1, or L2 power state, or enters into an active link (e.g., L0 state), then the SATA "COM-WAKE Detected" status may be reported. Conversely, if a PCIe link transitions from LTSSM polling to LTSSM configuration, then the SATA "COMINIT Detected" status may be reported.

Additionally or alternatively, by using techniques analogous to those presented above (and/or others), processes 70 and/or 70' (and/or other PCIe processes/layers) may implement PCIe credit based flow control, latency tolerance reporting, and/or direct memory access techniques, while maintaining compatible interaction and/or inter-operation with SATA processes 71, 74 and/or 71', 74'. Advantageously, this may permit these advanced and/or improved capabilities of PCIe protocol to be implemented in this embodiment, while still maintaining backward compatibility with SATA compliant processes.

Thus, an embodiment may include circuitry to (a) convert, at least in part, at least one serial storage protocol compatible frame into at least one packet that is compatible, at least in part, with a multi-lane input/output (I/O) protocol, and/or (b) convert, at least in part, the at least one packet into the at least one frame. The at least one packet may be transmitted via a physical layer that is compatible, at least in part, with the multi-lane I/O protocol. The at least one packet may comprise frame information structure (FIS) information of the at least one frame.

Advantageously, the features of this embodiment may permit SATA-based communications to be carried out at higher speeds and/or bandwidths than would be otherwise possible in accordance with SATA protocol, while maintaining full and harmonious compatibility with currently deployed SATA protocol drivers (and/or other SATA processes).

Many alternatives, modifications, and/or variations are possible without departing from this embodiment. For example, in this embodiment, PCIe links 150, 152 may be implemented, at least in part, via and/or as cabling (not shown) that may couple host 10 and device 20. In this arrangement, techniques may be employed to adapt, coordinate, and/or make compatible, at least in part, spread spectrum (non-common) clocking techniques employed in SATA protocol, to and/or with common clocking techniques employed in PCIe protocol. Also, for example, in addition to PCIe protocol, other and/or additional protocols may be employed for communicating via links 150, 152. Such other and/or additional protocols may include and/or be compatible with Intel® Thunderbolt™ technology, the protocol described in Mobile Graphics Low-Power Addendum to the PCI Express Base Specification Revision 1.0, PCI SIG, Oct. 21, 2003, and/or the protocol described in M-PHY v2.0, MIPI Alliance, Jun. 22, 2011. Of course, other and/or additional modifications are possible without departing from this embodiment.

What is claimed is:

1. An apparatus comprising:
    circuitry to at least one of:
        convert, at least in part, at least one serial storage protocol compatible frame into at least one packet that is compatible, at least in part, with a multi-lane input/output (I/O) protocol, the at least one packet to be transmitted via a physical layer that is compatible, at least in part, with the multi-lane I/O protocol, the at least one packet comprising frame information structure (FIS) information of the at least one frame; and
        convert, at least in part, the at least one packet into the at least one frame;
    wherein:
        the at least one frame is compatible, at least in part, with serial advanced technology attachment (SATA) protocol;
        the at least one packet is compatible, at least in part, with a peripheral component interconnect express (PCIe) protocol; and
        the circuitry is to execute at least one conversion process to convert the at least one frame into the at least one packet, the at least one conversion process being executed as part of a protocol stack that includes a SATA transport layer and a PCIe transaction layer.

2. The apparatus of claim 1, wherein:
    the at least one conversion process is executed intermediate to the SATA transport layer and the PCIe transaction layer in the stack.

3. The apparatus of claim 1, wherein:
    the FIS information is comprised, at least in part, in at least one payload of at least one PCIe vendor defined message (VDM) packet.

4. The apparatus of claim 1, wherein:
in accordance with the multi-lane protocol, link speed and link width are to be negotiated;
the at least one process is to negotiate, at least in part, the link speed and the link width; and
the at least one process is to indicate, at least in part, to at least one serial storage protocol process a negotiated bandwidth that is different from an actual bandwidth that results, at least in part, from the link speed and the link width, the negotiated bandwidth being in accordance with a serial storage protocol with which the at least one frame is compatible, at least in part.

5. The apparatus of claim 4, wherein:
the circuitry is to manage, at least in part, at least one state of at least one link of the physical layer so as to maintain compatibility with the serial storage protocol; and
the at least one state comprises at least one of the following:
power state; and
communication state.

6. The apparatus of claim 1, wherein:
the multi-lane protocol employs full duplex communication;
the at least one frame is compatible, at least in part, with a serial storage protocol that employs half-duplex communication; and
the circuitry is to temporarily store, at least in part, the at least one frame to emulate, at least in part, the half-duplex communication.

7. The apparatus of claim 1, wherein:
the circuitry is to manage, at least in part, communication status notifications to at least one serial storage process so as to maintain, at least in part, compatibility with a serial storage protocol with which the at least one frame is compatible, at least in part.

8. A method comprising:
at least one of the following subparagraphs (a) and (b):
   (a) converting, at least in part, by circuitry, at least one serial storage protocol compatible frame into at least one packet that is compatible, at least in part, with a multi-lane input/output (I/O) protocol, the at least one packet to be transmitted via a physical layer that is compatible, at least in part, with the multi-lane I/O protocol, the at least one packet comprising frame information structure (FIS) information of the at least one frame; and
   (b) converting, at least in part, the at least one packet into the at least one frame;
wherein:
   the at least one frame is compatible, at least in part, with serial advanced technology attachment (SATA) protocol;
   the at least one packet is compatible, at least in part, with a peripheral component interconnect express (PCIe) protocol; and
   the method also comprises executing at least one conversion process to convert the at least one frame into the at least one packet, the at least one conversion process being executed as part of a protocol stack that includes a SATA transport layer and a PCIe transaction layer.

9. The method of claim 8, wherein:
the at least one conversion process is executed intermediate to the SATA transport layer and the PCIe transaction layer in the stack.

10. The method of claim 8, wherein:
the FIS information is comprised, at least in part, in at least one payload of at least one PCIe vendor defined message (VDM) packet.

11. The method of claim 8, wherein:
in accordance with the multi-lane protocol, link speed and link width are to be negotiated;
the at least one process is to negotiate, at least in part, the link speed and the link width; and
the at least one process indicates, at least in part, to at least one serial storage protocol process a negotiated bandwidth that is different from an actual bandwidth that results, at least in part, from the link speed and the link width, the negotiated bandwidth being in accordance with a serial storage protocol with which the at least one frame is compatible, at least in part.

12. The method of claim 11, wherein:
the method comprises managing, at least in part, at least one state of at least one link of the physical layer so as to maintain compatibility with the serial storage protocol; and
the at least one state comprises at least one of the following:
power state; and
communication state.

13. The method of claim 8, wherein:
the multi-lane protocol employs full duplex communication;
the at least one frame is compatible, at least in part, with a serial storage protocol that employs half-duplex communication; and
the method comprises temporarily storing, at least in part, the at least one frame to emulate, at least in part, the half-duplex communication.

14. The method of claim 8, wherein:
the method comprises managing, at least in part, communication status notifications to at least one serial storage process so as to maintain, at least in part, compatibility with a serial storage protocol with which the at least one frame is compatible, at least in part.

15. Computer-readable memory storing one or more instructions that when executed by a machine result in performance of operations comprising:
at least one of the following subparagraphs (a) and (b):
   (a) converting, at least in part, at least one serial storage protocol compatible frame into at least one packet that is compatible, at least in part, with a multi-lane input/output (I/O) protocol, the at least one packet to be transmitted via a physical layer that is compatible, at least in part, with the multi-lane I/O protocol, the at least one packet comprising frame information structure (FIS) information of the at least one frame; and
   (b) converting, at least in part, the at least one packet into the at least one frame;
wherein:
   the at least one frame is compatible, at least in part, with serial advanced technology attachment (SATA) protocol;
   the at least one packet is compatible, at least in part, with a peripheral component interconnect express (PCIe) protocol; and
   the operations also comprise executing at least one conversion process to convert the at least one frame into the at least one packet, the at least one conversion process being executed as part of a protocol stack that includes a SATA transport layer and a PCIe transaction layer.

16. The computer-readable memory of claim 15, wherein:

the at least one conversion process is executed intermediate to the SATA transport layer and the PCIe transaction layer in the stack.

17. The computer-readable memory of claim 15, wherein:

the FIS information is comprised, at least in part, in at least one payload of at least one PCIe vendor defined message (VDM) packet.

18. The computer-readable memory of claim 15, wherein:

in accordance with the multi-lane protocol, link speed and link width are to be negotiated;

the at least one process is to negotiate, at least in part, the link speed and the link width; and the at least one process is to indicate, at least in part, to at least one serial storage protocol process a negotiated bandwidth that is different from an actual bandwidth that results, at least in part, from the link speed and the link width, the negotiated bandwidth being in accordance with a serial storage protocol with which the at least one frame is compatible, at least in part.

19. The computer-readable memory of claim 18, wherein:

the operations comprise managing, at least in part, at least one state of at least one link of the physical layer so as to maintain compatibility with the serial storage protocol; and the at least one state comprises at least one of the following: power state; and
communication state.

20. The computer-readable memory of claim 15, wherein:

the multi-lane protocol employs full duplex communication;

the at least one frame is compatible, at least in part, with a serial storage protocol that employs half-duplex communication; and the operations comprise temporarily storing, at least in part, the at least one frame to emulate, at least in part, the half-duplex communication.

21. The computer-readable memory of claim 15, wherein:

the operations also comprise managing, at least in part, communication status notifications to at least one serial storage process so as to maintain, at least in part, compatibility with a serial storage protocol with which the at least one frame is compatible, at least in part.

* * * * *